(12) United States Patent
Morse (10) Patent No.: US 7,186,286 B2
(45) Date of Patent: Mar. 6, 2007

(54) FILTER HOUSING ASSEMBLY WITH LEAK TESTABLE AEROSOL INJECTION PORT

(75) Inventor: Thomas C. Morse, Greenville, NC (US)

(73) Assignee: Camfil Farr, Inc., Riverdale, NJ (US)

( * ) Notice: Subject to any disclaimer, the term of this patent is extended or adjusted under 35 U.S.C. 154(b) by 45 days.

(21) Appl. No.: 10/998,833

(22) Filed: Nov. 29, 2004

(65) Prior Publication Data

US 2006/0112757 A1   Jun. 1, 2006

(51) Int. Cl.
    *B01D 46/00*   (2006.01)
(52) U.S. Cl. .............. 55/417; 55/418; 55/419; 55/420; 55/495; 55/502; 55/503; 73/40; 73/40.7
(58) Field of Classification Search .............. 55/385.1, 55/417, 418, 419, 420, 495, 502, 503; 73/38, 73/40, 40.7; 210/348, 418
    See application file for complete search history.

(56) References Cited

U.S. PATENT DOCUMENTS

| | | | | |
|---|---|---|---|---|
| 3,522,724 A | * | 8/1970 | Knab | 73/40.7 |
| 3,768,302 A | * | 10/1973 | Barringer | 55/417 |
| 3,816,984 A | * | 6/1974 | Neumann | 55/502 |
| 4,055,075 A | * | 10/1977 | Allan et al. | 73/40.7 |
| 4,088,463 A | | 5/1978 | Smith | |
| 4,371,386 A | | 2/1983 | DeVecchi | |
| 4,515,007 A | * | 5/1985 | Herman | 73/38 |
| RE31,952 E | * | 7/1985 | Wilcox et al. | 73/40.7 |
| 4,646,558 A | * | 3/1987 | Gualtieri et al. | 73/40.7 |
| 4,765,810 A | * | 8/1988 | Wetzel | 73/40 |
| 4,818,258 A | * | 4/1989 | Vann, III | 55/420 |
| 4,914,957 A | * | 4/1990 | Dougherty | 73/40 |
| 5,417,101 A | * | 5/1995 | Weich | 73/38 |
| 6,036,751 A | * | 3/2000 | Ribardi et al. | 55/419 |
| 6,327,893 B1 | * | 12/2001 | Choi | 73/38 |
| 6,770,108 B2 | | 8/2004 | Cherry, Sr. | |

OTHER PUBLICATIONS

"Pharmaseal", Product sheet 3420-0303, Camfil Farr, Inc. Washington NC, © Camfil Farr, date unknown.

* cited by examiner

*Primary Examiner*—Jason M. Greene
(74) *Attorney, Agent, or Firm*—Keith Taboada, Esq.; Patterson & Sheridan, LLP (57) ABSTRACT

A filter housing assembly having a leak testable aerosol injection port is a conduit coupled to an aerosol injection selectively traps aerosol port of the filter housing assembly after disconnecting an aerosol generator used to challenge a filter installed in the housing assembly. The trapped aerosol provides a high concentration challenge that facilitates leak testing of the aerosol injection port after the aerosol generator has been removed.

24 Claims, 8 Drawing Sheets

FILTER HOUSING ASSEMBLY WITH LEAK TESTABLE AEROSOL INJECTION PORT

BACKGROUND OF THE DISCLOSURE

1. Field of the Invention

The embodiments of the present invention relate generally to a filter housing assembly and leak testing thereof.

2. Background of the Invention

Cleanrooms are utilized in many industries for contamination control and to improve product yields. A plurality of filters, typically mounted in the ceiling of the cleanroom, are configured to remove particulates from air entering the cleanroom at a predetermined efficiency selected based upon the cleanliness requirements of the activities performed in the cleanroom. As particulates load the filtration media disposed in the filter, the airflow through the filter decreases as the pressure drop across the filter increases. Once the filter reaches a critical pressure drop, the filter is typically replaced.

On other applications, replacement of filters is scheduled based on time or processes performed within the cleanroom. For example, in many pharmaceutical and biotech cleanrooms, periodic replacement of filters is required to meet regulatory or owner specifications. To facilitate efficient replacement of the filter, a ducted supply hood is typically mounted in the cleanroom ceiling in which the filter may be readily removed and replaced from the cleanroom side of the ceiling.

In many applications, the installed replacement filter must be leak tested before normal cleanroom activities may commence. In order to perform a statistically valid leak test within a reasonable time period, an aerosol challenge is introduced into the hood upstream of the filter. To this end, these hoods are equipped with ports accessible from the clean room for injecting an aerosol challenge into the upstream plenum of the hood to facilitate testing.

Since the aerosol injection port is coupled to an aerosol generator during testing of the filter, leakage through the port cannot be tested during re-testing of the filter. Once the aerosol generator is removed and the aerosol injection port sealed, there is typically not enough challenge remaining in the plenum within the hood to enable reliable testing of the sealed port.

Therefore, there is a need for a ducted hood, i.e., a housing assembly, and a technique to facilitate testing of aerosol injection ports.

SUMMARY OF THE INVENTION

A filter housing assembly having a leak testable aerosol injection port and method for leak testing the injection port is provided. In one embodiment, an aerosol injection port is coupled to a filter housing assembly coupled to a conduit that selectively traps aerosol upstream of the aerosol injection port. The trapped aerosol provides a high concentration challenge that facilitates leak testing of the aerosol injection port. Such leak testing occurs after an aerosol generator that was used to provide aerosol test challenge during filter testing has been removed.

In another aspect of the invention, a method for leak testing an aerosol injection port is provided. In one embodiment, the method includes the steps of connecting an aerosol generator to an aerosol injection port, flowing aerosol through the aerosol injection port into a filter housing assembly, trapping aerosol upstream of aerosol injection port and testing the aerosol injection port for leakage.

BRIEF DESCRIPTION OF THE DRAWINGS

A more particular description of the invention, briefly summarized above, may be had by reference to the embodiments thereof that are illustrated in the appended drawings. It is to be noted, however, that the appended drawings illustrate only typical embodiments of this invention and, therefore, are not to be considered limiting of its scope, for the invention may admit to other equally effective embodiments.

To facilitate understanding, identical reference numerals have been used, where possible, to designate identical elements that are common to the figures.

DETAILED DESCRIPTION

Figure 1:
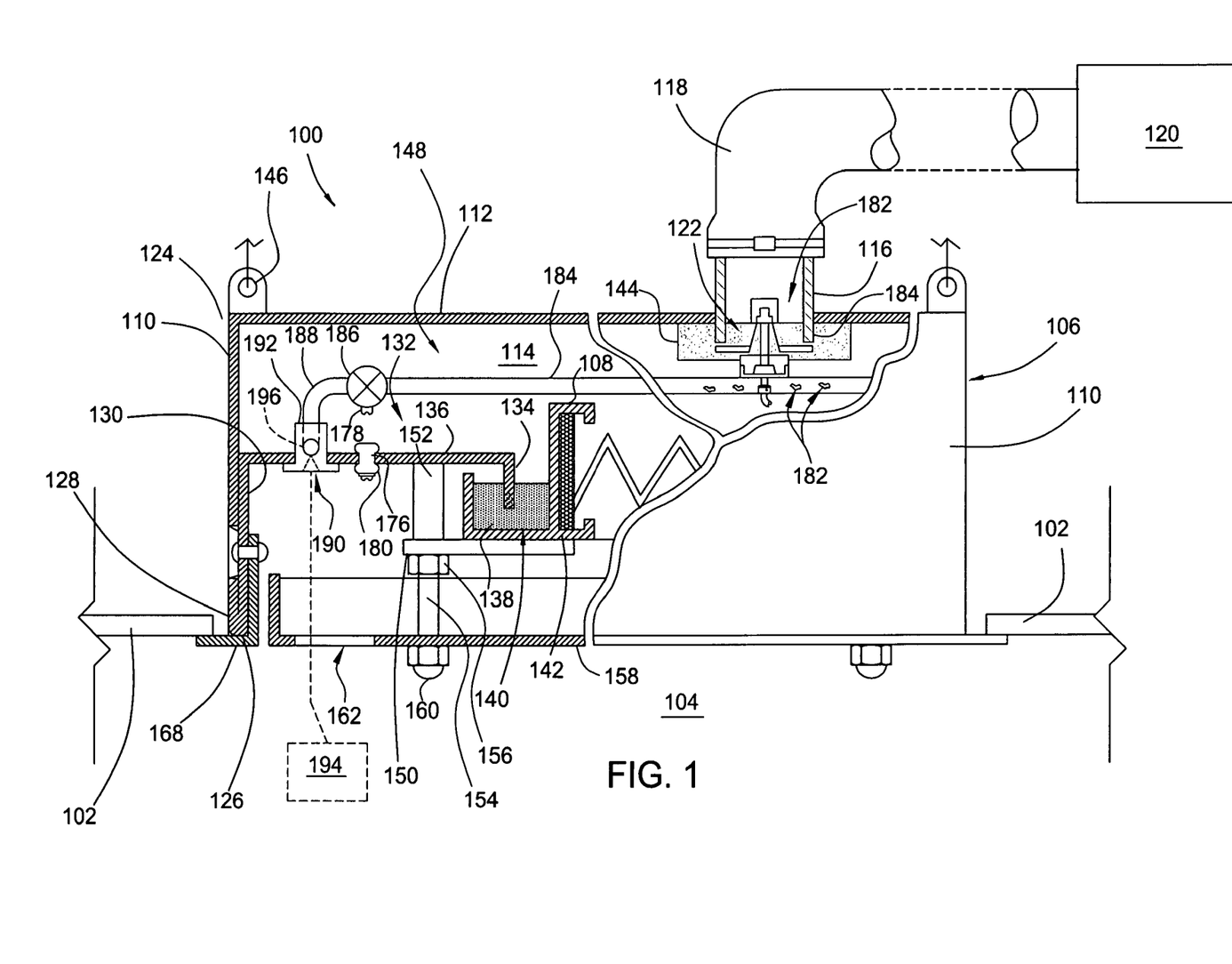
FIG. 1 depicts a simplified, partial sectional view of one embodiment of a filter housing assembly having an aerosol injection port configured for reliable leak testing.

FIG. 1 depicts a sectional view of one embodiment of a filter module 100 disposed in a ceiling 102 of a mini-environment or cleanroom 104. Typically, additional filter modules 100 (not shown) may be utilized in predetermined positions within the cleanroom 104 to provide predetermined levels of cleanliness and ventilation. The filter module 100 generally includes filter housing assembly 106 that retains a removable filter 108. The scale of FIG. 1 has been exaggerated for clarification of the interface between the housing assembly 106 and the filter 108. The filter housing assembly 106 includes a plurality of sidewalls 110 and a backplate 112 that define an interior volume 114.

The backplate 112 includes a collar 116 to facilitate coupling the filter housing assembly 106 to a duct 118 that supplies air from an air handler 120. The air handler 120 provides controlled air flow to the filter module 100. The air handler 120 may include one or more blowers or fans (not shown) and may additionally include pre-filtration elements such as ASHRAE or HEPA filters.

A damper 122 may be mounted behind the backplate 112 in the interior volume 114 of the housing assembly 106. The damper 122 adjusts the flow of air into the interior volume 114 of the housing assembly 106. The damper 122 may be closed to substantially stop the air flowing into the housing assembly 106 during replacement of the filter 108. The damper 122 may also be incrementally opened to balance the air flowing into the cleanroom 104 among other filters (not shown) providing air to the cleanroom 104. The damper 122 may include a diffuser plate 144 coupled to the housing assembly 106 for enhancing air flow uniformity through the filter 108.

The sidewalls 110 of the housing assembly 106 are generally fabricated from metals, such as aluminum, stainless steel, as well as plastic, or glass reinforced plastic, among others. The sidewalls 110 are generally configured in a polygonal form, typically square or rectangular. It is also contemplated that cylindrical housings may utilize a single sidewall 110.

The sidewalls 110 are sealingly coupled together at their intersections, for example, by welding, soldering, adhering, bonding, caulking and the like. The backplate 112 is generally coupled to the sidewalls 110 in a similar fashion to make the housing assembly 106 leak-tight. It is also contemplated that the housing assembly 106 may be utilized in open plenum applications that do not utilize a backplate 112.

Each sidewall 110 includes a first end 124 coupled to the backplate 112 and a second end 126 that interfaces with the cleanroom ceiling 102. A trim ring 168 may be provided to facilitate sealing of the housing assembly 106 to the ceiling 102. The first end 124 of the sidewall 110 and/or backplate 112 generally includes a mounting pad or tab 146 that facilitates coupling the housing assembly 106 to a supporting structure (not shown) above the ceiling 102 of the cleanroom 104. In one embodiment, the sidewalls 110 have a double wall that includes an outer section 128 disposed against at least a portion of an inner section 130. In the embodiment depicted in FIG. 1, the outer section 128 is disposed between the first end 124 and the second end 126 while the inner section 130 extends from the second end 126 along a portion of the outer section 128 to a sealing section 132. The outer and inner sections 128, 130 are sealingly joined at the second end 126, and in one embodiment, are fabricated from a continuous piece or sheet of material where the outer section 128 is folded at the second end 126 and transitions into the inner section 130.

In one embodiment, the sealing section 132 includes a knife edge 134 that is coupled to the inner section 130 by a flange 136. Typically, the knife edge 134 and flange 136 are fabricated from a single piece of material, and may also be fabricated with the inner section 130 of the sidewall 110 as a continuous piece of material. The knife edge 134 is orientated substantially perpendicular to the sidewalls 110 and is configured to interface with a sealing element 138 disposed at one end the filter 108 to create an air tight seal between the filter housing assembly 106 and the filter 108. Thus, the sealing section 132 separates the interior volume 114 of the housing assembly 106 into a plenum 148 upstream of the filter 108 and a downstream or roomside. In other words, the filter 108 interfacing with the sealing section 132 separates the unfiltered air upstream of the filter 108 with the clean, filtered air, downstream of the filter 108 that enters the cleanroom 104.

In the embodiment depicted in FIG. 1, the sealing element 138 is a silicon or polyurethane gel disposed in a trough 140 formed in a frame 142 of the filter 108. The knife edge 134 penetrates the gel to create an air seal between the filter 108 and housing assembly 106. It is contemplated that other sealing techniques, such as gaskets or caulk, may alternatively be utilized. Filter performance (i.e., efficiency, pressure drop) is generally selected based on filtering and resistance criteria needed for a particular application to be performed in the cleanroom 104. Filters manufactured for this use are commercially available, e.g., from CAMFIL FARR, INC., located in Riverdale, N.J.

The filter 108 is retained to the sealing section 132 of the housing assembly 106 by a pall latch 150. The pall latch 150 is mounted on a stud 154 extending from the filter housing assembly 106 and may be rotated to secure or release the filter 108 from the housing assembly 106. A standoff 152 is provided between the pall latch 150 and the flange 136 to insure proper penetration of the knife edge 134 into the gel 138 to provide an air-tight seal. A nut 156 is disposed on the stud 154 to lock the pall latch 150 in position.

The stud 154 is additionally utilized to mount a removeable screen 158 to the filter housing assembly 106. The screen 158 is retained to the stud 154 by an acorn nut 160.

An aerosol injection port 190 is provided to facilitate injection of an aerosol challenge into the interior volume 114 of the filter housing assembly 106 from an aerosol generator 194 (showing in phantom) during testing of the filter 108 while installed in the module 100. An aerosol distribution member 184 may be disposed in the housing assembly 106 and coupled to the injection port 190. The aerosol distribution member 184 includes a plurality of holes 182 that uniformly distribute aerosol, provided by the generator 194, in the plenum 148 to evenly challenge the filter 108 during testing. In the embodiment depicted in FIG. 1, the aerosol injection port 190 is disposed through the flange 136 of the sealing section 132. However, it is also contemplated that the aerosol injection port may be disposed in the ceiling 102 of the cleanroom 104, in the filter 108 or in other suitable locations. A suitable location is any location that is accessible to a technician and enables the aerosol challenge to be supplied to the volume 114.

In one embodiment, the aerosol injection port 190 is sealed by a quick disconnect 192 that enables the aerosol generator 194 to be easily coupled thereto during testing of the filter 108. One suitable quick disconnect is available from Colder Products Company, headquartered in St. Paul, Minn. The quick disconnect 192 may include an internal check valve 196 (shown in phantom) or other sealing device that prevents flow through the aerosol injection port 190 when the generator 194 is disconnected from the downstream side of the port 190. It is also contemplated that the aerosol injection port 190 may be sealed utilizing alternative element, such as a ball or other type of valve, or an expanding plug, cap plug or other type of plug.

The quick disconnect 192 is coupled by a conduit 188 to an isolation valve 186 disposed in the interior volume 114 of the filter housing assembly 106. The outlet of the isolation valve 186 is coupled to the aerosol distribution member 184. The isolation valve 186 may be a check valve, ball valve, needle valve, gate valve, plug valve, butterfly valve, shear seal valve, diaphragm valve or other valve suitable for facilitating control of aerosol passage from the generator 194 through the conduit 188 and into the aerosol distribution member 184. In embodiments where the isolation valve 186 is a check valve, return flow from the aerosol distribution member 184 into the conduit 188 is prevented.

In the embodiment depicted in FIG. 1, the isolation valve 186 is a manually operated ball valve. An actuator 178 of the isolation valve 186 may be accessed through a hole 176 formed through the flange 136 of the filter housing assembly 106. The hole 176 may be selectively sealed a penetration 180, such as a removable expanding plug as shown in FIG. 1.

Figure 1A:
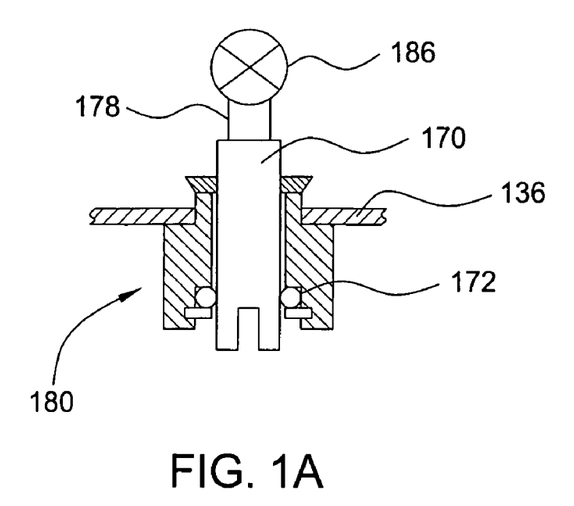
FIG. 1A is a partial sectional view of one embodiment of a penetration.

Alternatively as seen in FIG. 1A, the actuator 178 or a shaft 170 coupled thereto, may extended through the hole 176 and the penetration 180 to facilitate changing the state of the valve 186. In such an embodiment, the penetration 180 includes an seal 172 such as an o-ring, gasket or other packing material, for example, silicon grease, that maintains an air-tight seal between the shaft 172 and the filter housing assembly 106.

It is contemplated that other types of valve actuators, such as electric (solenoid, motor and the like), pneumatic, hydraulic and the like may alternatively be utilized to control the open and closed state of the isolation valve 186. The aerosol injection port 190 and the penetration 180 may be accessed by removing the screen 158. Alternatively, the screen 158 may include one or more access holes 162 formed therethrough to allow access to the port and penetration 190, 180 without removal of the screen.

In operation, the aerosol generator 194 is coupled to the aerosol injection port 190. A fitting (not shown) from the aerosol generator supply line generally opens the valve 196 of the disconnect 192 upon mating therewith. The aerosol generator 194 is turned on and the isolation valve 186 is actuated to an open state to facilitate entry of aerosol into the plenum 148 through the aerosol injection member 184. Typical aerosol generators provide aerosol at an elevated pressure, for example, around 20 pounds per square inch. After completion of filter testing, the isolation valve 186 is actuated to a closed position, and the aerosol generator 194 is disconnected from the aerosol injection port 190. The check valve 196 within the quick disconnect 192 traps a volume of aerosol in the conduit 188 between the quick disconnect 192 and the isolation valve 186. As the pressure of the aerosol trapped in the conduit 188 is greater than the pressure within the cleanroom 104 and plenum 148, any leakage through the aerosol injection port 190 into the cleanroom 104 may be readily detected if the aerosol trapped in the conduit 188 moves past the check valve 192. Leakage through the quick disconnect 196 and port 190 may be detected by conventional devices, such as a photometer or particle counter. The isolation valve 186 may be configured so that pressure (and thus the trapped aerosol) slowly decays or leaks therethrough into the plenum 148, to substantially remove the residual pressure differential across the port 190 during normal cleanroom operation to minimize the potential of leakage of the aerosol at a later time. Alternatively, the trapped aerosol may be released into the plenum 148 for capture by the filter 108 by opening the isolation valve 186 after testing the injection port 190. The isolation valve 186 may be optionally closed later to provide a redundant seal of the port 190.

Figure 2:
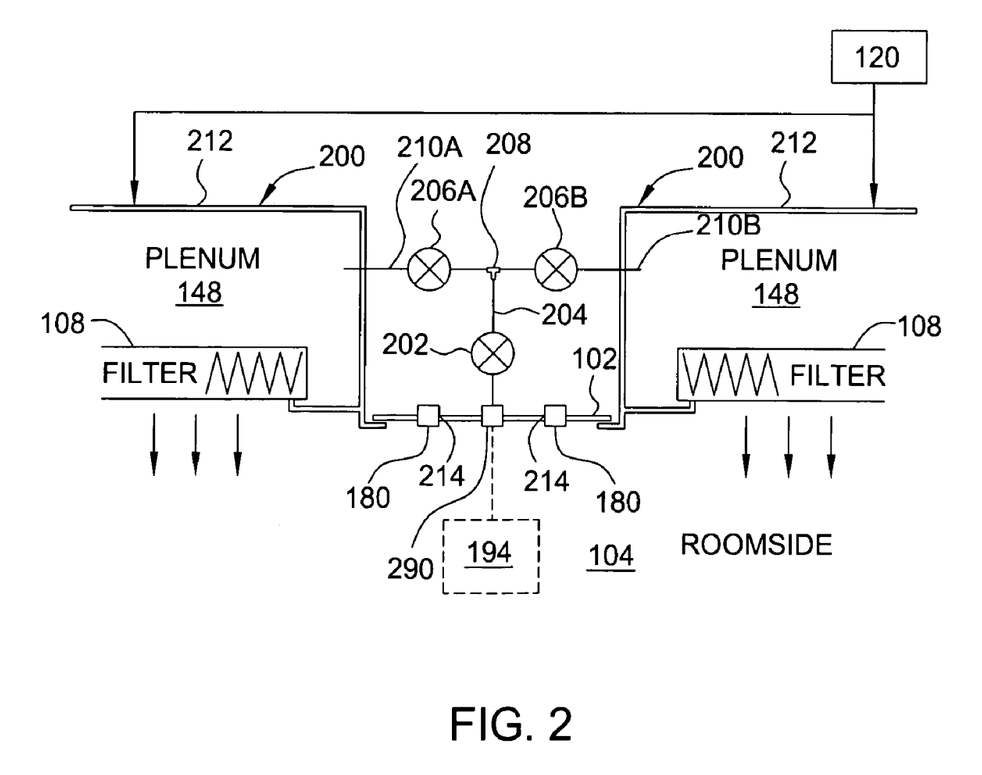
FIG. 2 is a partial sectional view of another embodiment of a filter housing assembly.

FIG. 2 is another embodiment of a filter housing assembly 200 mounted in a ceiling 102 of a cleanroom 104. The module 200 is substantially similar to the module 100 described above, except wherein the injection port 290 is disposed in the ceiling 102 of the cleanroom 104.

As shown in the embodiment depicted in FIG. 2, a first valve 202 is coupled to the aerosol injection port 290 disposed in the ceiling 102. As discussed above with reference to the aerosol injection port 190 depicted in FIG. 1, the aerosol injection port 290 may incorporate the first valve 202 in the form of a check valve or another type of valve, such as those described with reference to the isolation valve 186 above. The first valve 202 is coupled to a second valve 206A by a conduit 204. The second valve 206A may be of the kind described for isolation valve 186 above. A tube 210A extends from the outlet of the second valve 206A and penetrates the housing assembly 212 of the filter module 200 to facilitate aerosol delivery to the plenum 148 of the module 200. The tubing 210A may be coupled to an aerosol distribution member similar to that shown in FIG. 1.

Figure 2A:
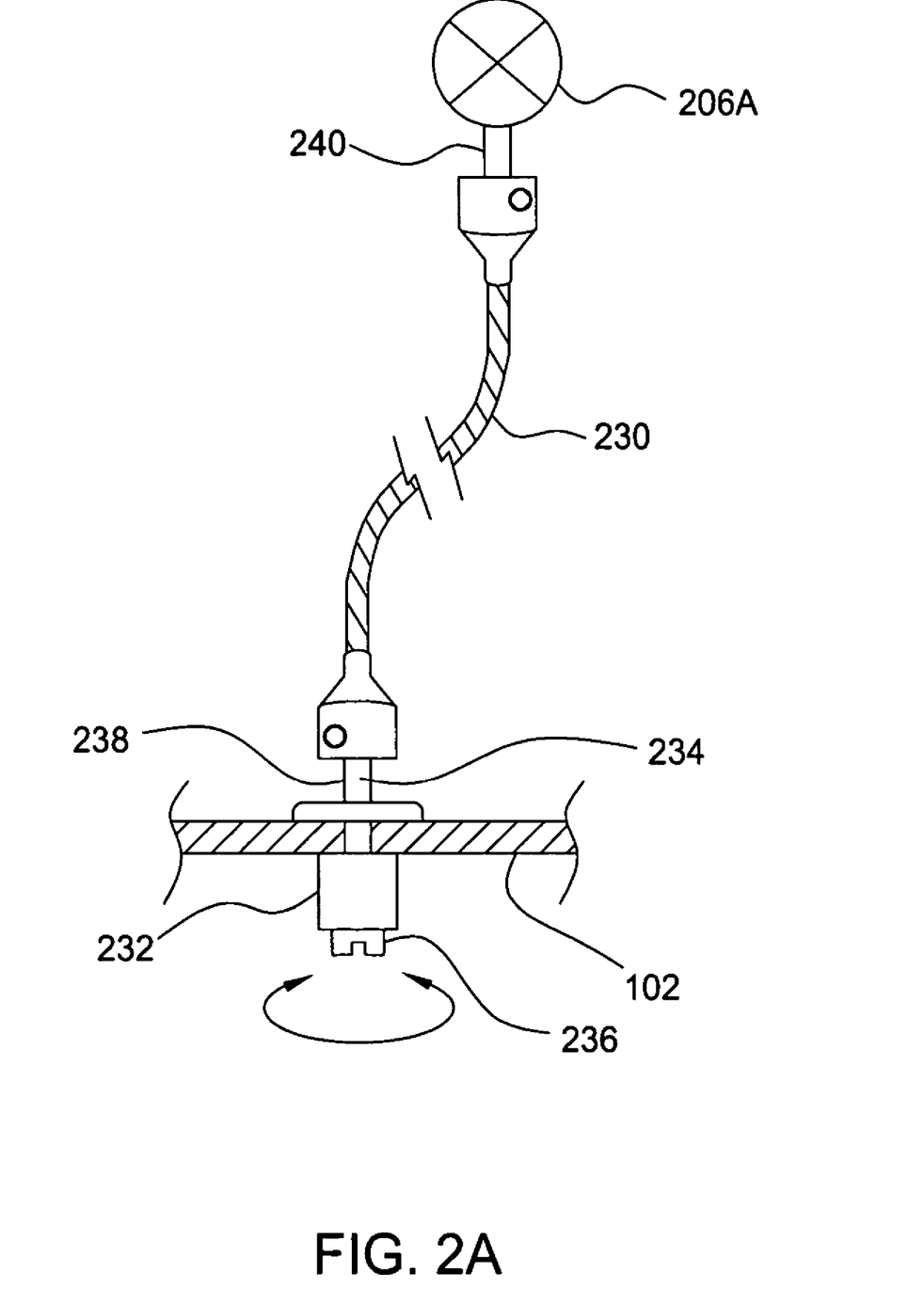
FIG. 2A is a sectional view of one embodiment of a valve remotely coupled to an actuator.

An access port 214 is provided in the ceiling 102 to allow the actuation state of the second valve 206A to be controlled from the room side of the cleanroom 104. The access port 214 is typically sealed with a penetration 180. Alternatively, the actuation state of the second valve 206A, or any other valve described herein, may be controlled by a sealed penetration extending through the ceiling 102 (or housing assembly in other embodiments). The penetration 232 generally includes a shaft 234 having a head 236 disposed on the room side of the ceiling 102 configured to engage with an adjustment tool, such as a screwdriver, hex drive or the like. A second end 238 of the shaft 234 is adapted for coupling to an actuator 240 of the second valve 206A. In the embodiment depicted in FIG. 2A, the penetration 232 is coupled to the actuator 240 of the second valve 206A by coupling, such as a flexible rotary cable 230.

Returning to FIG. 2, leakage through the aerosol injection port 290 may be detected as described above by trapping aerosol provided by the aerosol generator 194 during testing of the filter 108 in the conduit 204 disposed between the valves 202, 206A.

Optionally, the aerosol injection port 290 may be adapted to provide aerosol challenge to two or more filter modules 200. In such an embodiment, the conduit 204 may include a tee 208 coupling the first valve 202 to a second valve 206B. The outlet of the second valve 206B is coupled by a tube 210B to the plenum 148 of a second filter module 200. Additional filter modules (not shown) may be coupled to the conduit 204 in a similar manner. Thus, by controlling the open/closed actuation state of the second valves 206A, 206B, aerosol may be directed to various filter modules 200 disposed in the sealing through a common aerosol injection port 290, while still facilitating leak testing of the port 290.

Figure 3:
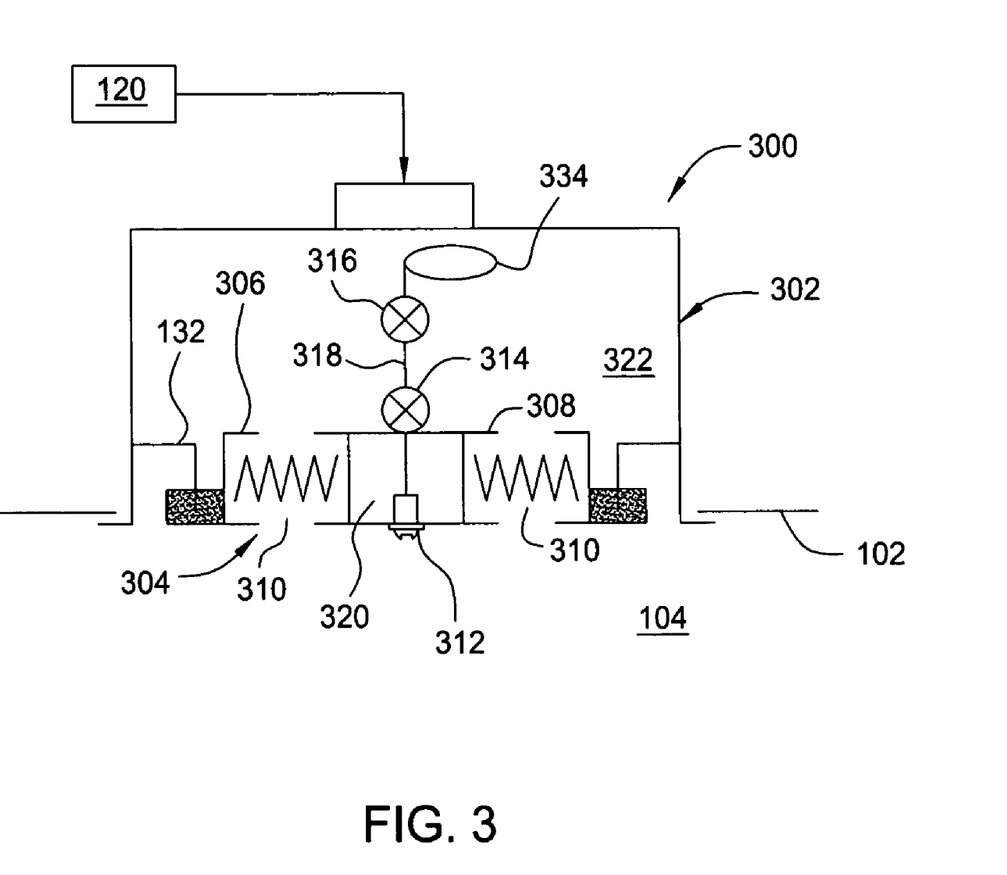
FIG. 3 is a sectional view of another embodiment of a filter housing assembly having a filter with an aerosol injection port configured for reliable leak testing.

FIG. 3 depicts another embodiment of a filter module 300 disposed in a ceiling 102 of a cleanroom 104. The filter module 300 is generally similar to the filter modules described above, and includes a housing assembly 302 and having a sealing section 132 adapted to sealingly interface with a filter 304. The filter 304 generally includes a frame 306 and at least one center board 308 separating two or more filtration media packs 310. The center board 308 includes a passage 320 formed therethrough. The passage port 320 serves as an aerosol injection port that facilitates delivery of aerosol to the plenum 322 of the filter module 300 with the filter 304 installed. The room side of the passage 320 formed through the center board 308 may be sealed with a removable, expandable plug 312. The passage 320 is coupled to a first valve 314 disposed in the plenum 322 of the filter housing assembly 302. Alternatively, the first valve 314 may be disposed at least partially or completely within the center board 308 and may eliminate the need for the plug 312 if positioned proximate the downstream side of the centerboard 308.

A conduit 318 couples the first valve 314 to a second valve 316. The second valve 316 may be coupled to an aerosol distribution member 324 disposed in the plenum 322. As discussed above, the first and second valves 314, 316 may be actuated to trap aerosol within the conduit 318 to test the leak integrity of the aerosol injection port 320.

The valves 314–316, which facilitate trapping of the challenge in the conduit 318, may be permanently coupled to the filter 304. Alternatively, one or more of the valves 314, 316 may be coupled to the filter housing assembly 302.

Figure 3A:
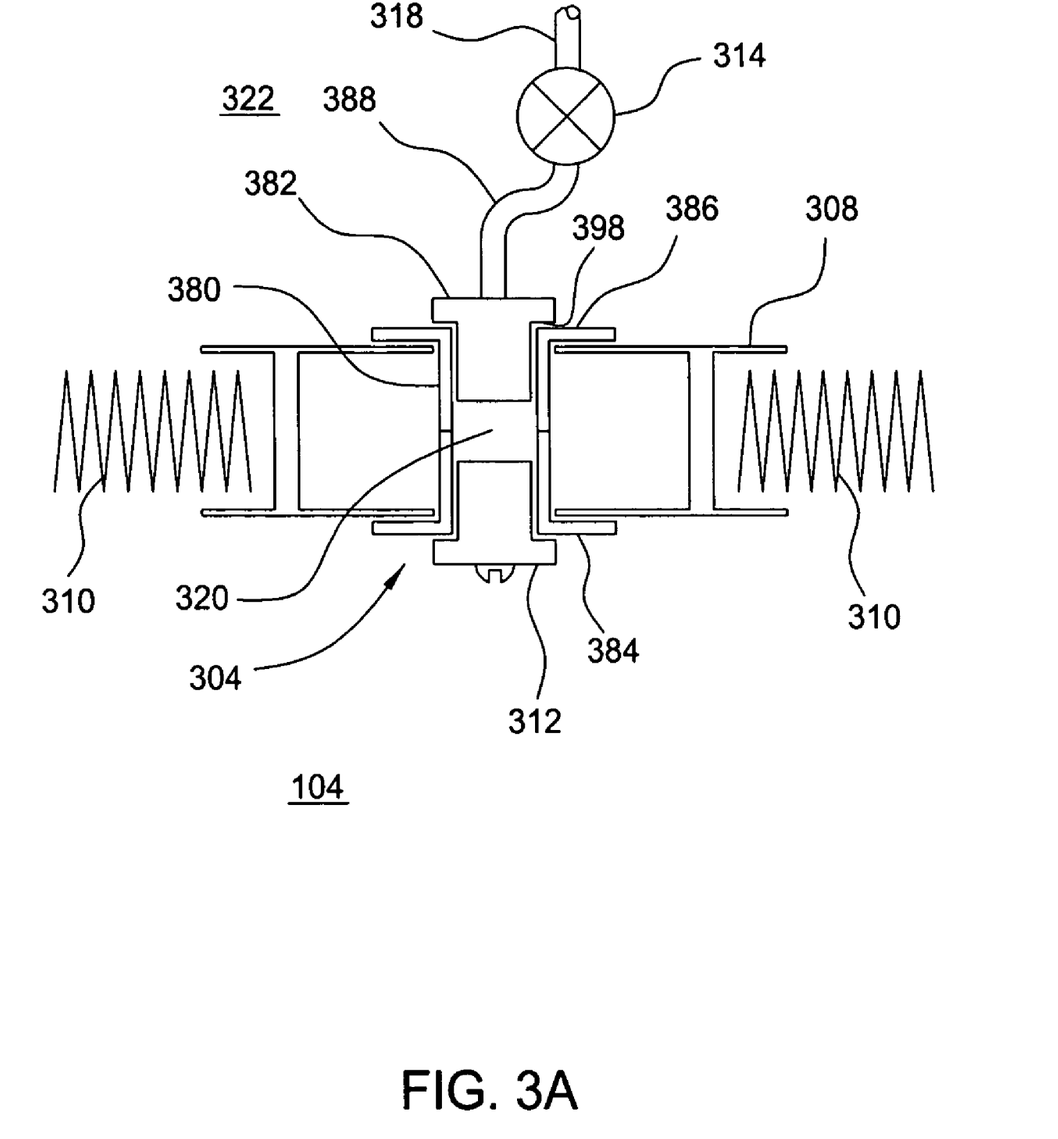
FIGS. 3A–3B are sectional views of the injection port of FIG. 3.

FIG. 3A depicts an embodiment of the filter 304 where the valves 314, 316 are removably coupled to the filter 304. The valves 314, 316 may be permanently coupled to the filter housing assembly 302 or be removable with the filter 304 and transferred to the replacement filter for reinstallation into the housing 302.

To facilitate efficient and rapid removal of the valves 314, 316 from the centerboard 308, a quick disconnect 382 is mounted to the plenum side of the centerboard 308. A tube 388 couples the quick disconnect 382 to the first valve 314. The length of the tube 388 may be configured to allow the filter 304 to be removed from the housing assembly 302 while the valve 314 remains in the filter housing assembly 302. In embodiments where the valves 314, 316 are removed with the filter 304, the tube 388 may be shorter or the valve 314 directly coupled to the centerboard 308. It is also contemplated that other suitable fittings may be utilized in place of the quick disconnect 382.

In the embodiment depicted in FIG. 3A, a sleeve 380 is provided through the centerboard 308. A first end 384 of the tube 380 is sealingly coupled to the room side of the centerboard 308 and is adapted to receive the removable plug 312. A first end 384 of the sleeve 380 may be sealed to the centerboard 308 by conventional methods, such as welding, soldering, swaging, caulking and the like. A retaining ring 386 may be disposed on the tube 380 to secure the tube in the centerboard 308.

A second end 390 of the sleeve 308 is coupled to the first valve 314. As described above, the valve 314 may be directly coupled to the sleeve 380, or as shown in the embodiment depicted in FIG. 3A, the quick disconnect 382 may be sealingly coupled to the second end 390 of the sleeve 380 to facilitate coupling of the aerosol injection port 320 defined through the sleeve 380 to the first valve 314 by a tube 388.

Figure 3B:
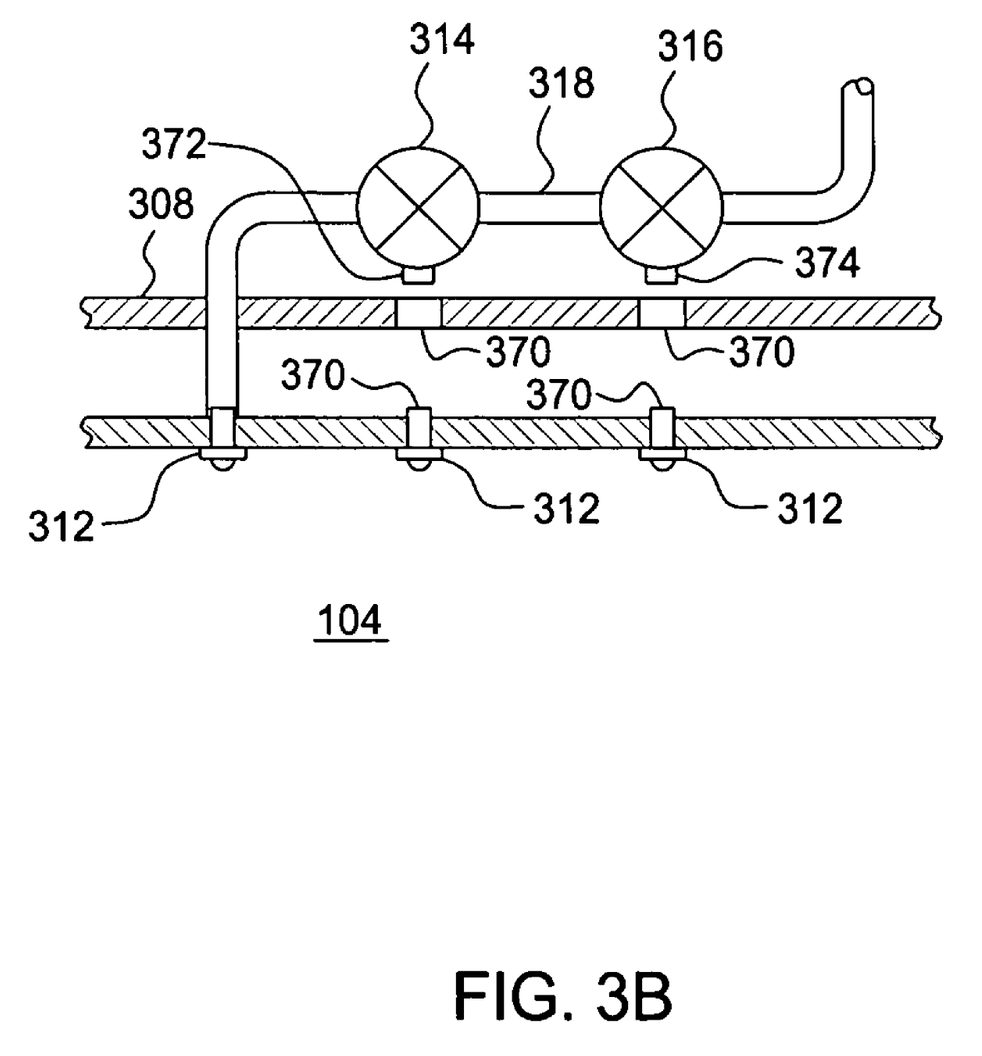

Access to the actuators 372, 374 of the valves 314, 316 is provided through holes 370 formed through the centerboard 308. The holes 370 may be plugged on the room side of the centerboard 308 by an expendable, removable plug 312. With the plug 312 removed, a screwdriver or other device may be passed through the centerboard 308 to access the actuators 372, 374 to change the state of the valves 314, 316 depicted in FIG. 3B.

In any of the embodiments described above, one or more of the first or second valves may be an electric valve. Utilization of electric valves to control the open and closed state of the aerosol injection port allows the control of the electric actuator to be remotely located relative to the valves, providing greater design flexibility. Fluid operated valves may be similarly controlled.

Figure 4:
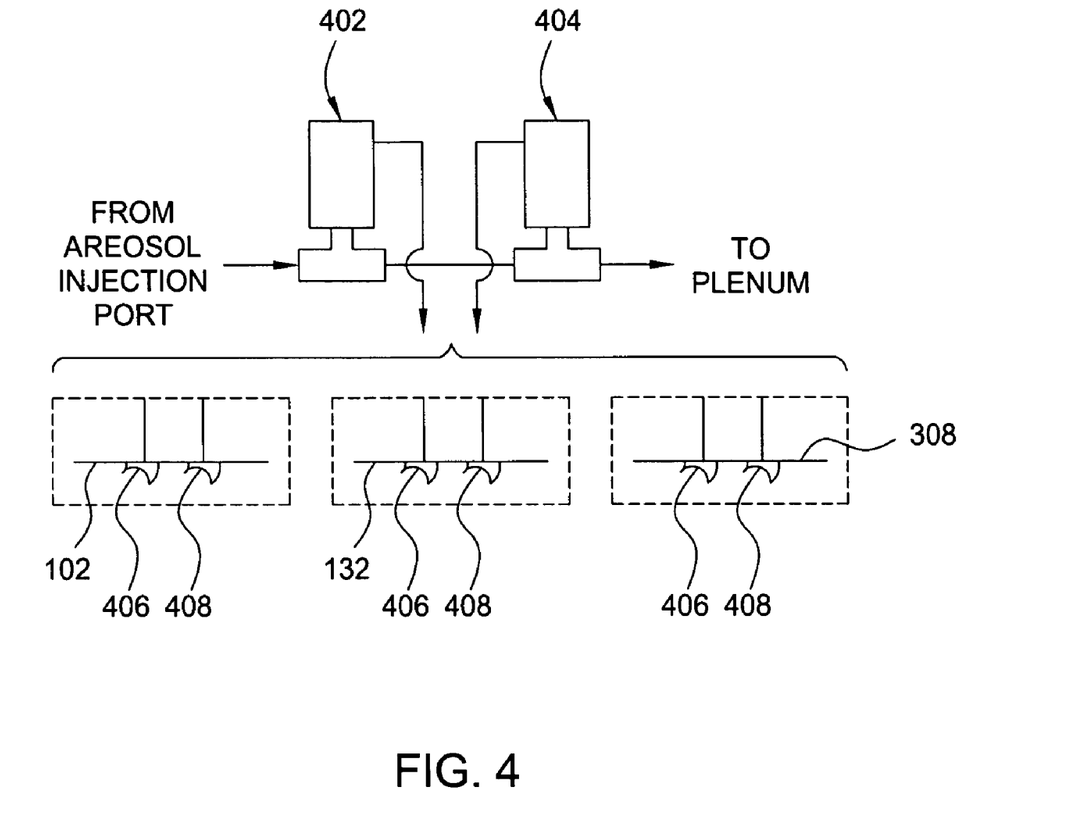
FIG. 4 is a schematic of alternative placements for a solenoid valve switch.

For example, as depicted in FIG. 4, switches 406, 408 for controlling the actuation state of the first and second electric valves 402, 404 may be positioned on the clean room ceiling 102, the sealing section 132 (or other portion) of the filter housing assembly 106, or the center board 308 (or other portion) of the filter 304, irregardless of whether one or both of the first and/or second valves are disposed above the ceiling 102 of the cleanroom 104, in the plenum 148 of the filter housing assembly 106, and/or within a portion of the filter 404.

Figure 5:
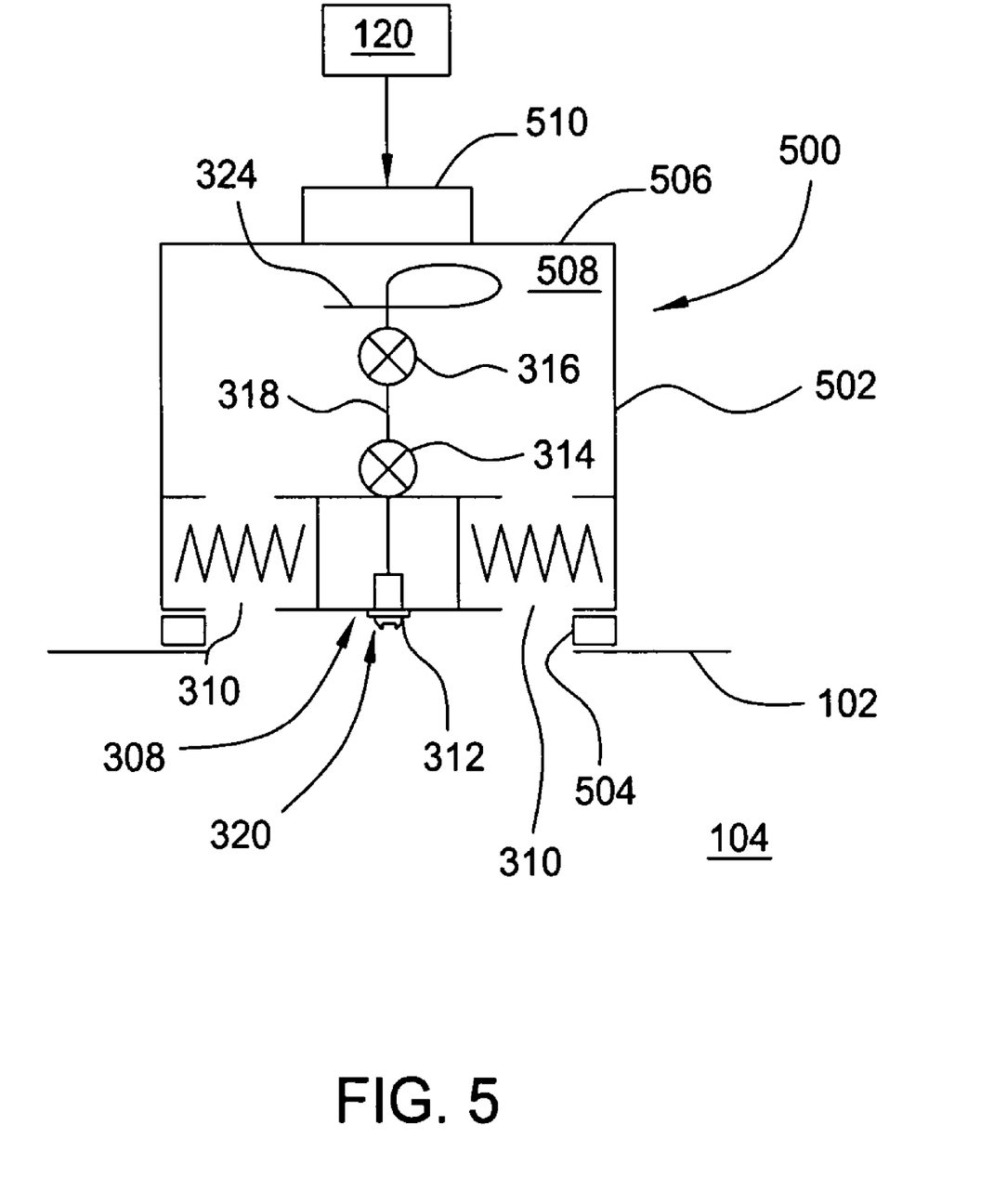
FIG. 5 is a sectional view of one embodiment of a terminal diffuser having an aerosol injection port configured for reliable leak testing.

FIG. 5 depicts one embodiment of a treadmill diffuser 500 having a leak testable aerosol injection port 320. The aerosol injection port 320 is substantially similar to the aerosol injection port described above with reference to FIGS. 3 and 3A.

A terminal diffuser 500 generally includes a frame 502 coupled to a backplate 506. The backplate 506 includes a collar 510 adapted to provide air from the air handler 120 to a plenum 508 defined between the backplate 506 and one or more filter media packs 310 retained in the frame 502. The collar 510 may alternatively be disposed through the frame 502. A gasket 504 is generally coupled to the frame 502 and provides a seal between the terminal diffuser 500 and a ceiling 502 of a cleanroom 104. It is contemplated that the terminal diffuser 500 and the ceiling 102 may be sealed using a gel and knife edge as described above.

In the embodiment depicted in FIG. 5, the aerosol injection port is disposed through a centerboard 308 separating two media packs 310. A first and second valve 314, 316 are provided within the plenum 308 of the terminal diffuser 500 to control the flow that selectively traps aerosol in a conduit 318 upstream of the aerosol injection port. Thus, actuation of the valves 314, 316 may be provided through any of the methods described above or other suitable method which retains the leak integrity of the terminal diffuser 500. As the aerosol challenge may be selectively trapped in the conduit 318, the leakage through the aerosol injection port 320 may be tested after installation of the filter into the cleanroom 104 or, alternatively, prior to installation.

Thus, a room side replaceable filter module has been provided having an aerosol injection port configured to enable efficient leak testing of the port. Advantageously, the aerosol injection port is configured to trap an aerosol challenge, thereby facilitating accurate and more rapid and more reliable leak testing over conventional designs which rely on leak detection using upstream particulate concentrations at ambient levels.

Although various embodiments which incorporate the teachings of the present invention have been shown and described in detail herein, those skilled in the art can readily devise many other varied embodiments that still incorporate these teachings.

What is claimed is:

1. A filter housing assembly comprising:
    a housing having an air in let formed therein;
    an opening formed in the housing and adapted to sealingly receive a filter;
    a port formed through the housing;
    a first valve coupled to the housing;
    a second valve disposed in the housing and sealingly coupled to the port; and
    a conduit disposed in the housing sealingly coupling the first and second valves in series.

2. The filter housing assembly of claim 1, wherein the second valve is selected from the group consisting of a ball valve, a check valve, a gate valve, a needle valve, a plug valve, a shear seal valve and a diaphragm valve.

3. The filter housing assembly of claim 1, wherein the second valve has a manual actuator, a pneumatic actuator, a hydraulic actuator or an electric actuator.

4. The filter housing assembly of claim 2, wherein the second valve is manually actuatable through a second port formed in the housing.

5. The filter housing assembly of claim 1 further comprising:
    a quick disconnect coupled to the port.

6. The filter housing assembly of claim 5, wherein the quick disconnect further comprises the first valve.

7. The filter housing assembly of claim 1, wherein the housing further comprises:
    a first portion adapted to sealingly interface with the filter; and
    a second portion adapted to interface with a structure in which the housing is mounted, wherein the port is formed through a portion of the housing between the first and second portions.

8. The filter housing assembly of claim 1, wherein the housing further comprises:
    a first portion adapted to sealingly interface with the filter; and a second portion adapted to interface with a structure in which the housing is mounted, wherein the port is formed through the housing between the second portion and the inlet.

9. The filter housing assembly of claim 1, wherein the second valve is an electric valve.

10. The filter housing assembly of claim 9 further comprising:
a switch coupled to the electric valve.

11. The filter housing assembly of claim 9, wherein the switch is not coupled to the housing.

12. The filter housing of claim 9, wherein the switch is coupled to the housing.

13. The filter housing assembly of claim 1 further comprising:
an aerosol distribution element disposed in the housing and coupled to the first valve opposite the port.

14. The filter housing assembly of claim 1, wherein the housing further comprises:
a penetration sealingly coupled to the housing; and
a rotary cable coupled to the penetration and an actuator of the second valve.

15. A filter housing assembly comprising:
a housing adapted to sealingly receive a removable filter;
a passage defined in a conduit disposed in the housing having a first end fluidly coupled to a plenum area defined in the housing and a second end adapted for coupling to an aerosol generator, wherein at least a portion of the volume defined in the conduit is selectively trapped in the passage;

a first valve coupled to a first end of the conduit; and a second valve coupled to the second end of the conduit, the first and second valves coupled in series.

16. The filter housing assembly of claim 15, wherein the second valve is selected from the group consisting of a ball valve, a check valve, a gate valve, a needle valve, a plug valve, a shear seal valve and a diaphragm valve.

17. The filter housing assembly of claim 16, wherein the second valve has a manual actuator, a pneumatic actuator, a hydraulic actuator or an electric actuator.

18. The filter housing assembly of claim 15, wherein the first valve is a quick disconnect.

19. The filter housing assembly of claim 15, wherein the second valve is an electric valve.

20. The filter housing assembly of claim 15, wherein the first end of the conduit is mounted accessible through a structure to which the filter housing assembly is mounted.

21. The filter housing assembly of claim 15 further comprising:

a second filter housing assembly having a conduit teed into the conduit coupled to the first filter housing assembly.

22. A filter module comprising:

a housing assembly;

a filter sealingly engaged with the housing assembly;

a port disposed through the filter and coupled to a first valve;

a second valve disposed upstream of the first valve; and a conduit disposed in the housing assembly fluidly coupling the first and second valves in series.

23. A filter housing assembly comprising:

a housing having an air inlet formed therein;

an opening adapted to sealingly receive a filter;

a port formed through the housing;

a first valve disposed in the housing and sealingly coupled to the port;

a second valve;

a conduit sealingly coupled to the first and the second valves; and a quick disconnect coupled to the port, wherein the quick disconnect further comprises the first valve.

24. A filter housing assembly comprising:

a housing adapted to sealingly receive a removable filter;

a passage created by a conduit having a first end fluidly coupled to a plenum area defined in the housing and a second end adapted for coupling to an aerosol generator, wherein at least a portion of the volume defined in the conduit is selectively trapped in the passage; and a first valve coupled to the first end of the conduit and a second valve coupled to the second end of the conduit, wherein the first valve is a quick disconnect.

* * * * *

UNITED STATES PATENT AND TRADEMARK OFFICE
CERTIFICATE OF CORRECTION

| | | |
|---|---|---|
| PATENT NO. | : 7,186,286 B2 | Page 1 of 1 |
| APPLICATION NO. | : 10/998833 | |
| DATED | : March 6, 2007 | |
| INVENTOR(S) | : Morse | |

It is certified that error appears in the above-identified patent and that said Letters Patent is hereby corrected as shown below:

In the Drawings:
On Sheet 7 of 8, in FIG. 4, in line 2, delete "AREOSOL" and insert -- AEROSOL --, therefor.

In column 4, lines 6-7, delete "removeable" and insert -- removable --, therefor.

In column 4, line 62, delete "penentration" and insert -- penetration --, therefor.

In column 8, line 30, in Claim 1, delete "in let" and insert -- inlet --, therefor.

Signed and Sealed this

Fifteenth Day of May, 2007

JON W. DUDAS
*Director of the United States Patent and Trademark Office*